United States Patent [19]

Tominaga

[11] Patent Number: 5,001,695

[45] Date of Patent: Mar. 19, 1991

[54] OPTICAL INFORMATION PROCESSING APPARATUS FOR STOPPING TRACKING AND/OR FOCUSING CONTROLS IN AN AREA HAVING PREFORMAT SIGNAL RECORDED THEREIN

[75] Inventor: Hidekazu Tominaga, Kawasaki, Japan

[73] Assignee: Canon Kabushiki Kaisha, Tokyo, Japan

[21] Appl. No.: 313,488

[22] Filed: Feb. 22, 1989

[30] Foreign Application Priority Data

Feb. 25, 1988 [JP] Japan ................................ 63-40594

[51] Int. Cl.$^5$ ............................................. G11B 7/00
[52] U.S. Cl. ............................. 369/44.26; 369/44.35
[58] Field of Search ............... 369/44.26, 44.27, 44.35, 369/109

[56] References Cited

U.S. PATENT DOCUMENTS

| | | | |
|---|---|---|---|
| 4,503,324 | 3/1985 | Yokota | 369/44.39 X |
| 4,661,942 | 4/1987 | Yoshimoto et al. | 369/44 |
| 4,761,775 | 8/1988 | Murakami | 369/44.26 |

FOREIGN PATENT DOCUMENTS 59-142757 8/1984 Japan .

OTHER PUBLICATIONS

Patent Abstracts of Japan, vol. 7, No. 15, 1/1983, No. 57-169932.
Patent Abstracts of Japan, vol. 8, No. 275, 12/1984, No. 59-142757.
Patent Abstracts of Japan, vol. 9, No. 227, 9/1985, No. 60-85444.
Patent Abstracts of Japan, vol. 10, No. 160, 6/1986, No. 61-11941.

*Primary Examiner*—Robert L. Richardson
*Attorney, Agent, or Firm*—Fitzpatrick, Cella, Harper & Scinto

[57] ABSTRACT

An apparatus for recording and/or reproducing information by scanning a light beam on a track of an optical recording medium, while the track is tracking-controlled and/or focusing-controlled is disclosed. The track being scanned has a preformat signal partially recorded in a longitudinal area thereof, and the tracking control and/or focusing control are stopped while the light beam passes through the area of the track in which the preformat signal is recorded.

7 Claims, 6 Drawing Sheets ical signal is produced by a difference between the RF1 signal 13-a and the RF2 signal 13-b, and the preformat signal is produced by a sum of the RF1 signal 13-a and the RF2 signal 13-b.

OPTICAL INFORMATION PROCESSING APPARATUS FOR STOPPING TRACKING AND/OR FOCUSING CONTROLS IN AN AREA HAVING PREFORMAT SIGNAL RECORDED THEREIN

BACKGROUND OF THE INVENTION

1. Field of the Invention

The present invention relates to an optical information processing apparatus for irradiating a focused light beam to an optical recording medium to record and/or reproduce information.

2. Related Background Art

An apparatus for recording and reproducing a signal by utilizing a laser beam has been put in practice. Examples are a compact disk (CD) player and a laser disk (LD) player. In such an apparatus, a signal is recorded as pits 2 on a disk 1 as shown in FIG. 1. In order to read the information signal from the disk 1, a light beam is irradiated to the disk 1 and it is optically scanned to read the pits 2. By scanning a track in which the pits 2 have been formed, by the light beam, the strength of reflected light changes depending on the presence or absence of a pit so that the information pits can be optically read out.

On the other hand, a magneto-optical disk apparatus in which a light beam is irradiated to a magneto-optical disk having spiral or concentric tracks to optically record, reproduce and erase an information signal, has also been developed. FIG. 2 shows a magneto-optical disk 3 used in such an apparatus.

In FIG. 2, numeral 4 denotes a signal track guide groove. A magneto-optical signal is recorded at a midpoint of the track guide groove and the adjacent track guide groove. Numeral 5 denotes preformat pits of a detection pattern such as track address, sector address and sector mark formed between adjacent track guide grooves when the magneto-optical disk is to be used as a data information disk. An address is detected from the preformat pits 5, and data corresponding to the address are reproduced, recorded or erased by the magneto-optical signal before the next preformat pit 5 is detected.

In the tracking servo system in which tracking is effected by using the track guide groove 4 of the disk 3, a reflection factor of the disk surface is low at the position of the preformat pit, and an S/N ratio of the tracking error signal is also low, and noise appears. While the preformat pits occupy only 4–5% of the total track gruide grooves, they lower the reliability of tracking and make the servo system unstable.

On the other hand, Japanese Laid-Open Patent Application No. 59-142757 discloses an apparatus which detects a defect of an optical recording medium to hold a tracking signal. However, in this apparatus, no countermeasure for the impact of the preformat signal to the servo system is taken.

The above problem also occurs in a focusing servo for accurately focusing the light beam onto the medium.

SUMMARY OF THE INVENTION

It is an object of the present invention to provide an optical information processing apparatus which solves the above problems and which can always attain stable tracking and/or focusing control.

The above object of the present invention is achieved in an apparatus for recording and/or reproducing information by scanning a light beam on a track of an optical recording medium, the track having a preformat signal partially recorded along a longitudinal area thereof, while the track is tracking-controlled and/or focusing-controlled, wherein the tracking control and/or focusing control are stopped while the light beam passes through the area of the track in which the preformat signal is recorded.

DETAILED DESCRIPTION OF THE PREFERRED EMBODIMENTS

Figure 1:
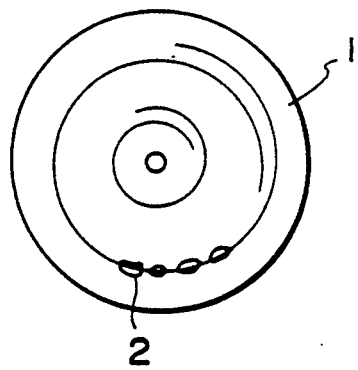
FIG. 1 shows an external view of a conventional CD or LD disk.
Figure 2:
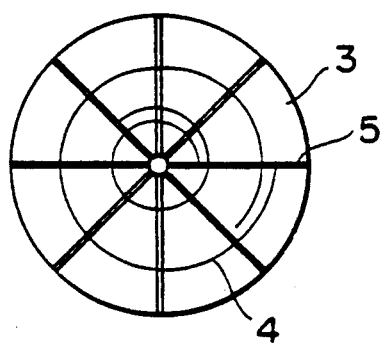
FIG. 2 shows an external view of a magneto-optical disk.
Figure 3:
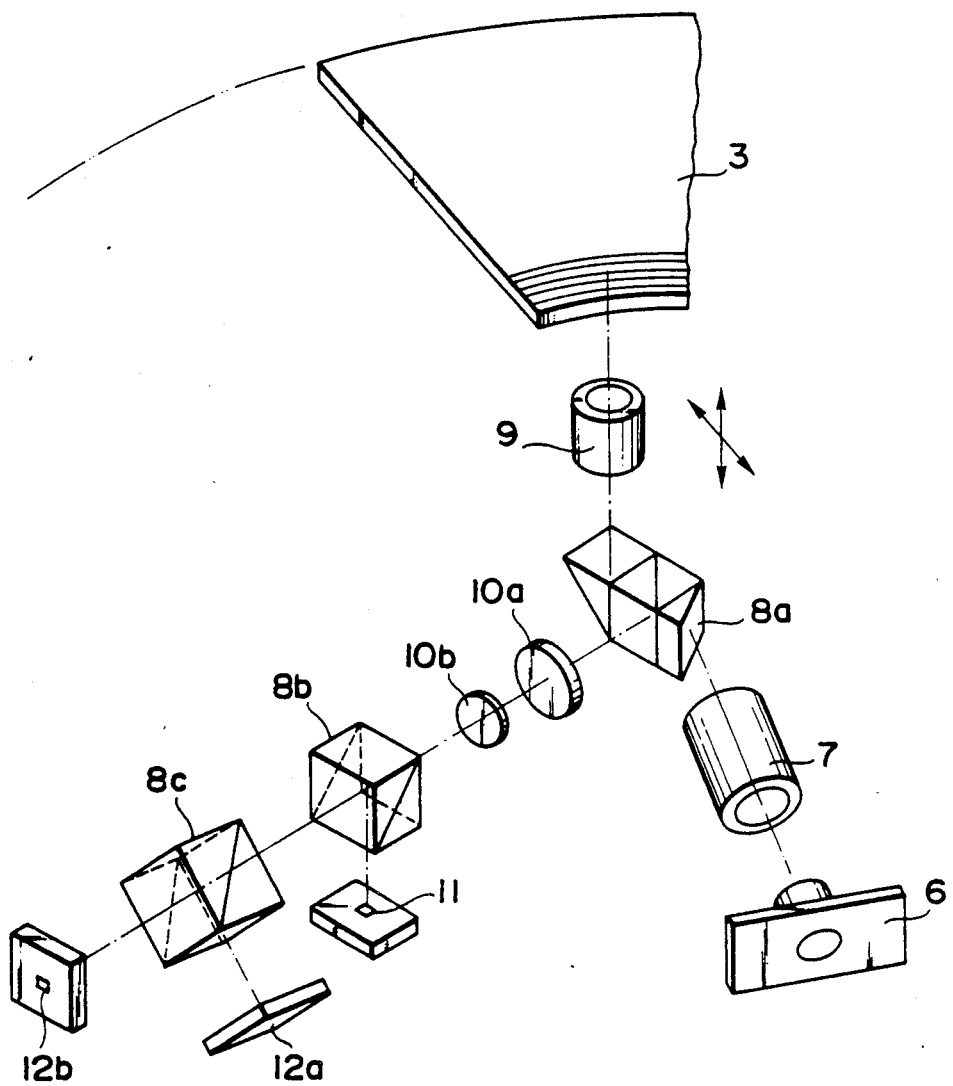
FIG. 3 shows an optical system of one embodiment of the present invention.

FIG. 3 shows a schematic perspective view of an optical system in one embodiment of the present invention applied to a magneto-optical disk apparatus.

A light beam for reading and writing information of a magneto-optical signal is emitted from a laser light source 6 having a laser diode, and it passes through a collimater lens 7 which collimates the light beam and is directed to the disk by a polarized beam splitter (PBS) 8a, and focused onto a magneto-optical disk 3 by an objective lens 9. Reflected light from the disk 3 contains the information of the disk and it passes through the objective lens 9 and the PBS 8a and is directed to a detector. The reflected light directed to the detector by the PBS 8a passes through condenser lenses 10a and 10b which condense the light beam to the detector, and one of the light beams passes through a PBS 8b and is focused to a servo detector 11 which picks up a servo error signal. The other reflected light beam passes through the PBS 8b and a PBS 8c and reaches an RF1 detector 12a and an RF2 detector 12b which pick up the magneto-optical signal and the prepit signal, respectively.

Figure 4:
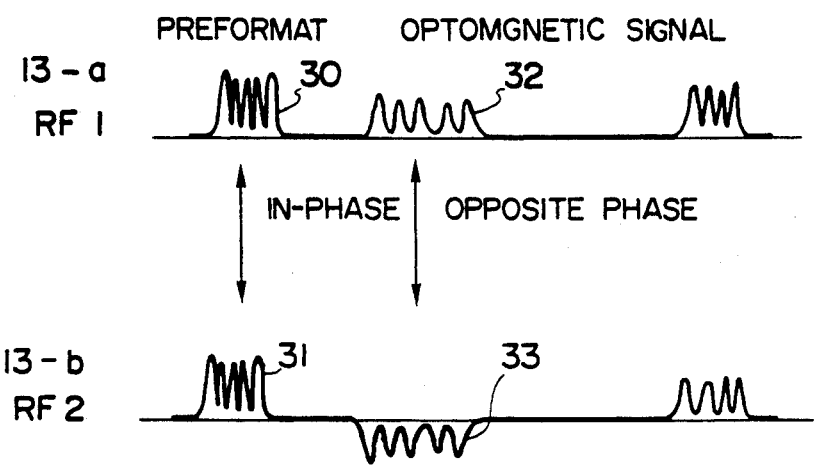
FIG. 4 shows an output waveform of an RF signal.

Signal waveforms of the RF1 detector 12a and the RF2 detector 12b are shown in FIG. 4. Numerals 30 and 31 denote prepit signals, and numerals 32 and 33 denote magneto-optical signals. As shown in FIG. 4, the magneto-optical signals 32 and 33 for the RF1 signal and the RF2 signal are of opposite phase, while the preformat signals 30 and 31 are in phase. Thus, the magneto-optical signal is produced by a difference between the RF1 signal 13-a and the RF2 signal 13-b, and the preformat signal is produced by a sum of the RF1 signal 13-a and the RF2 signal 13-b.

Detection means for detecting the preformating area by the RF signals is explained with reference to FIGS. 5 and 6.

Figure 5:
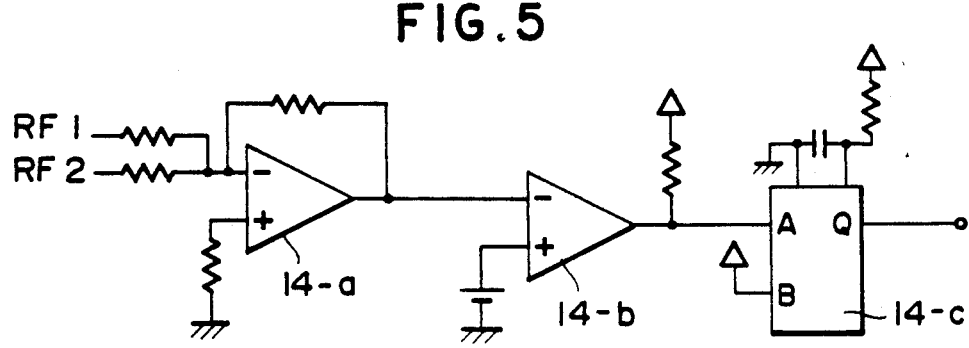
FIG. 5 shows a preformat detecting circuit.
Figure 6:
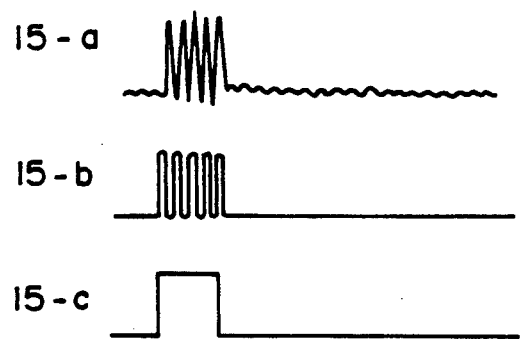
FIG. 6 shows output waveforms in the detector of FIG. 5.

FIG. 5 shows a preformat detecting circuit and FIG. 6 shows signal waveforms.

In FIG. 5, the RF1 signal 13-a and the RF2 signal 13-b are added by a summing amplifier 14-a. Since the magneto-optical signals 32 and 33 are of opposite phase, the magneto-optical signals are cancelled by each other and only the preformating signal is left, as shown by signal 15-a in FIG. 6, at approximately the mid-point of a noise level and a peak level of the signal 15-a, as shown by signal 15-b in FIG. 6.

Finally, it is reshaped by a one-shot multi-vibrator 14-c, as shown by 15-c in FIG. 6.

Figure 7:
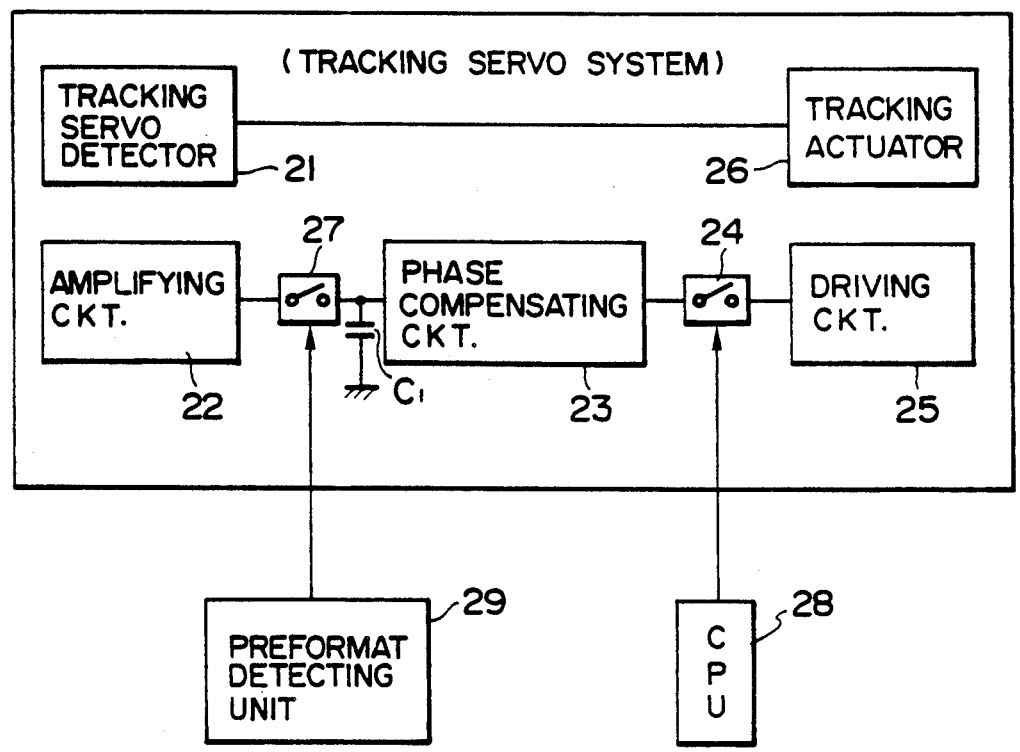
FIG. 7 shows a block diagram of a tracking servo system of one embodiment of the present invention.

FIG. 7 shows a block diagram of a tracking servo system of the magneto-optical disk apparatus in the embodiment of the present invention. A tracking servo detector 21 detects a deviation from the track guide groove of the disk 3 by the laser beam as a tracking error signal. The tracking error signal is amplified to a desired level by an amplifier 22 and an output of the amplifying circuit 22 is compensated for by a phase compensating circuit 23 which attains a desired phase margin. A loop switch 24 opens and closes the tracking servo under control of a central processing unit (CPU) 28. A driving circuit 25 drives an actuator 26 in accordance with the tracking error signal to reduce the deviation. The servo is effective when the loop switch 24 is closed. A circuit comprising a switch 27 and a capacitor 23, connected between the amplifying circuit 22 and the phase compensating circuit 23 is a hold circuit which is a characteristic element of the present invention. It is activated or deactivated by the output of the preformat detecting unit 29.

Figure 8:
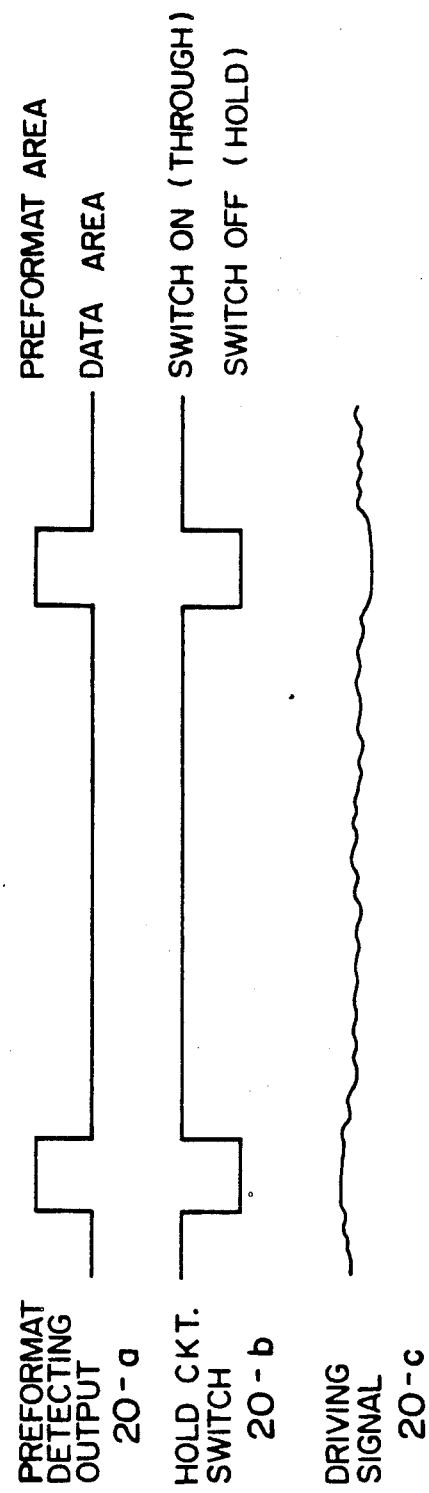
FIG. 8 shows a timing chart for explaining an operation of the embodiment.

FIG. 8 shows a timing chart for the operation of the apparatus. Interpolation of the preformat area by the preformat detection output produced as shown in FIG. 6 is explained with reference to the timing chart of FIG. 8.

An output signal 20-a of the preformat detecting unit 29 is high in the preformat area and low in the data area. A reverse signal 20-b of the signal 20-a is used as a switching signal to the hold circuit. In the data area, the switch 27 is turned on, and in the preformat area, the switch 27 is turned off. A drive signal 20-c for the actuator is shown in FIG. 8. In the data area, the servo signal passes through, and in a high noise area of the preformat area, a noise-free servo signal appears immediately prior to the preformat being held. Since the preformat area occupies only 4-5% of the overall area, the previous servo signal is held during the preformat period. When the next data area appears and the servo signal is slow, the servo system can follow sufficiently. By holding the previous servo signal, the disturbance of the tracking error signal in the vicinity of the preformat area is less than that when the servo signal is not held, and any instability in the servo system is avoided.

In the present embodiment, the holding is started when the preformat area is detected. If a situation occurs such that a noise area is also held, a circuit for generating the preformat detection signal a little bit earlier than the preformat area may be added, or a lowpass filter for eliminating the switch noise may be inserted before the hold circuit in order to attain a positive hold operation.

In the present embodiment, the separate preformat detecting unit 29 is provided. In an actual apparatus, it is included in the RF signal processing circuit, because the preformat detecting unit is necessary in reading the address. Accordingly, the hold circuit may be controlled by the output signal of the RF signal processing circuit.

In the present embodiment, the interpolation of the tracking error signal was explained. A similar method may be applied to the focusing error signal.

Figure 9:
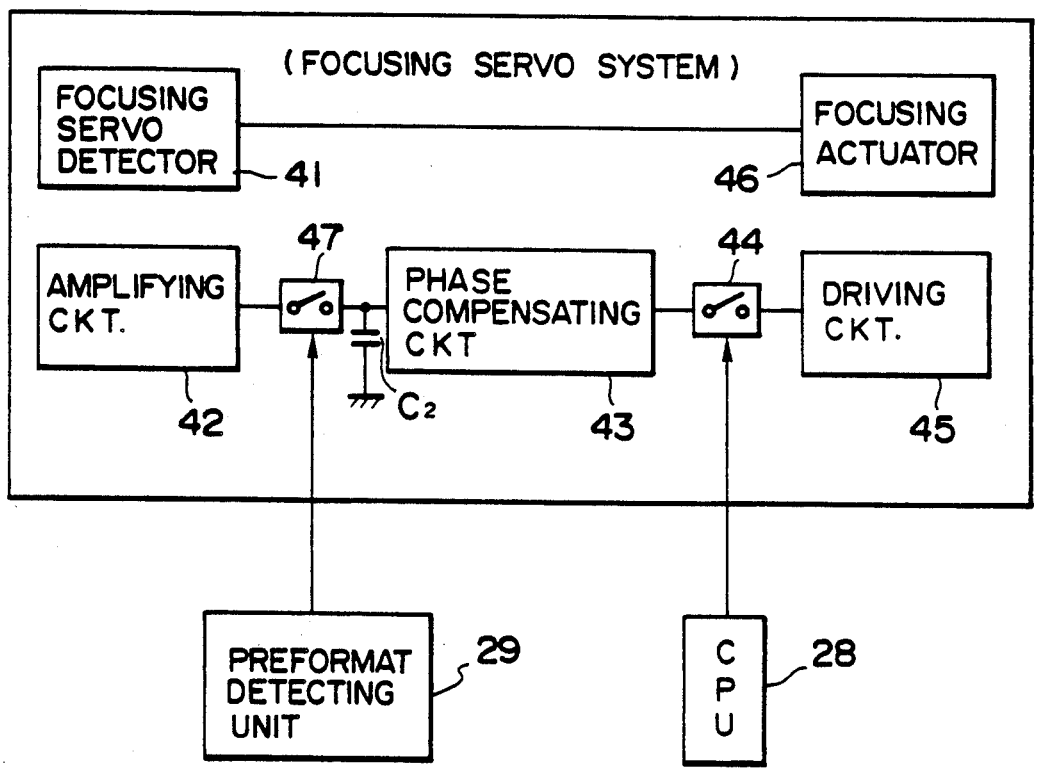
FIG. 9 shows a block diagram of a focusing servo system in the embodiment.

A block diagram of a focusing servo system of the magneto-optical disk apparatus according to the present invention is shown in FIG. 9.

Numeral 41 denotes a focusing servo detector, numeral 42 denotes an amplifying circuit, numeral 43 denotes a phase compensating circuit, numerals 44 and 47 denote switches, numeral 45 denotes a driving circuit, numeral 46 denotes a focusing actuator and $C_2$ denotes a capacitor. The switch 47 and the capacitor $C_2$ constitute a hold circuit. The switches 44 and 47 are controlled by the CPU 28 and the preformat detecting unit 29, respectively.

The focusing servo system of the present invention is constructed basically similarly to the tracking servo system. The operation is exactly the same as that of the tracking servo system.

The present invention is not limited to the illustrated embodiment, but various modifications may be made. For example, the present invention is also applicable to the magneto-optical medium and direct-read-after-write (DRAW) type medium of card type or tape type or of any shape.

What is claimed is:

1. An apparatus for recording and/or reproducing information by scanning of a light beam on a track of an optical recording medium while said track is tracking-controlled and/or focusing-controlled, said track having a preformat signal recorded partially in a longitudinal area thereof,
   wherein said tracking control and/or focusing control are stopped while the light beam passes through the area of said track in which the preformat signal is recorded.

2. An apparatus for recording and/or reproducing information by scanning of a light beam on a track of an optical recording medium, said track having a preformat signal recorded partially in a longitudinal area thereof, comprising:
   means for tracking controlling and/or focusing-controlling the light beam;
   means for detecting the preformat signal recorded in the track; and
   means for deactivating said tracking control and/or focusing control means in accordance with an output of said detection means while the light beam passes through the area of the track in which the preformat signal is recorded.

3. An apparatus for recording and/or reproducing information according to claim 2, wherein said tracking control and/or focusing control means include an optical system for focusing the light beam onto the medium, means for detecting tracking and/or focusing error signals, and means for driving the optical system perpendicularly to the optical axis of the optical system and/or along the optical axis in accordance with an output of the error detection means.

4. An apparatus for recording and/or reproducing information according to claim 3, wherein said means for deactivating the tracking and/or focusing control means includes means for holding the tracking and/or focusing error signal applied to said drive means.

5. An apparatus for recording and/or reproducing information according to claim 2, wherein said preformat signal detection means detects the preformat signal from a reflected light beam from the medium.

6. An apparatus for recording and/or reproducing information by scanning a light beam on a track of an optical medium, said track having a preformat signal recorded partially in a longitudinal area thereof, comprising:
- a light source;
- a lens for focusing a light beam emitted from said light source to the medium;
- an actuator for driving said lens perpendicularly to an optical axis of said lens and/or along the optical axis;
- a detector for detecting tracking and/or focusing error signals of the light beam;
- a feedback control circuit in order to feedback the error signals detected by said detector back to said actuator;
- a detecting circuit for detecting the preformat signal; and
- a circuit arranged in said feedback control circuit for holding the error signal applied to said actuator in accordance with the output of said preformat signal detecting circuit.

7. An apparatus for recording and/or reproducing information according to claim 6, wherein said preformat signal detecting circuit detects the preformat signal from a reflected light beam from the medium.

* * * * *

UNITED STATES PATENT AND TRADEMARK OFFICE
CERTIFICATE OF CORRECTION

PATENT NO. : 5,001,695

DATED : March 19, 1991

INVENTOR(S) : Hidekazu Tominaga

It is certified that error appears in the above-identified patent and that said Letters Patent is hereby corrected as shown below:

COLUMN 2

Line 53, "RFℓ" should read --RF1--.

COLUMN 3

Line 6, "signal 15-a in FIG. 6. at approximately the mid-point of" should read as follows:

--signal 15-a in FIG. 6.

This signal is binarized by a comparator 14-b at approximately the mid-point of--.

Signed and Sealed this

Twentieth Day of October, 1992

*Attest:*

DOUGLAS B. COMER

*Attesting Officer*     *Acting Commissioner of Patents and Trademarks*